C. R. PRATT.
ROTARY PISTON POWER TRANSMISSION.
APPLICATION FILED JULY 26, 1910.

1,137,283.

Patented Apr. 27, 1915.
8 SHEETS—SHEET 1.

WITNESSES:
Cornelius Gabrichie.
Frances E. Blodgett.

INVENTOR
Charles R. Pratt,
BY Russell M. Everett,
ATTORNEY.

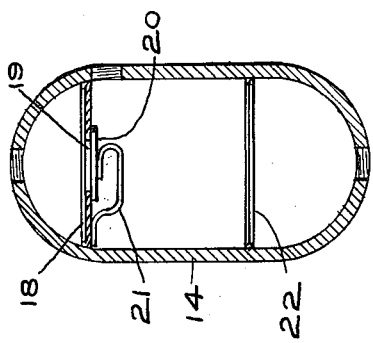
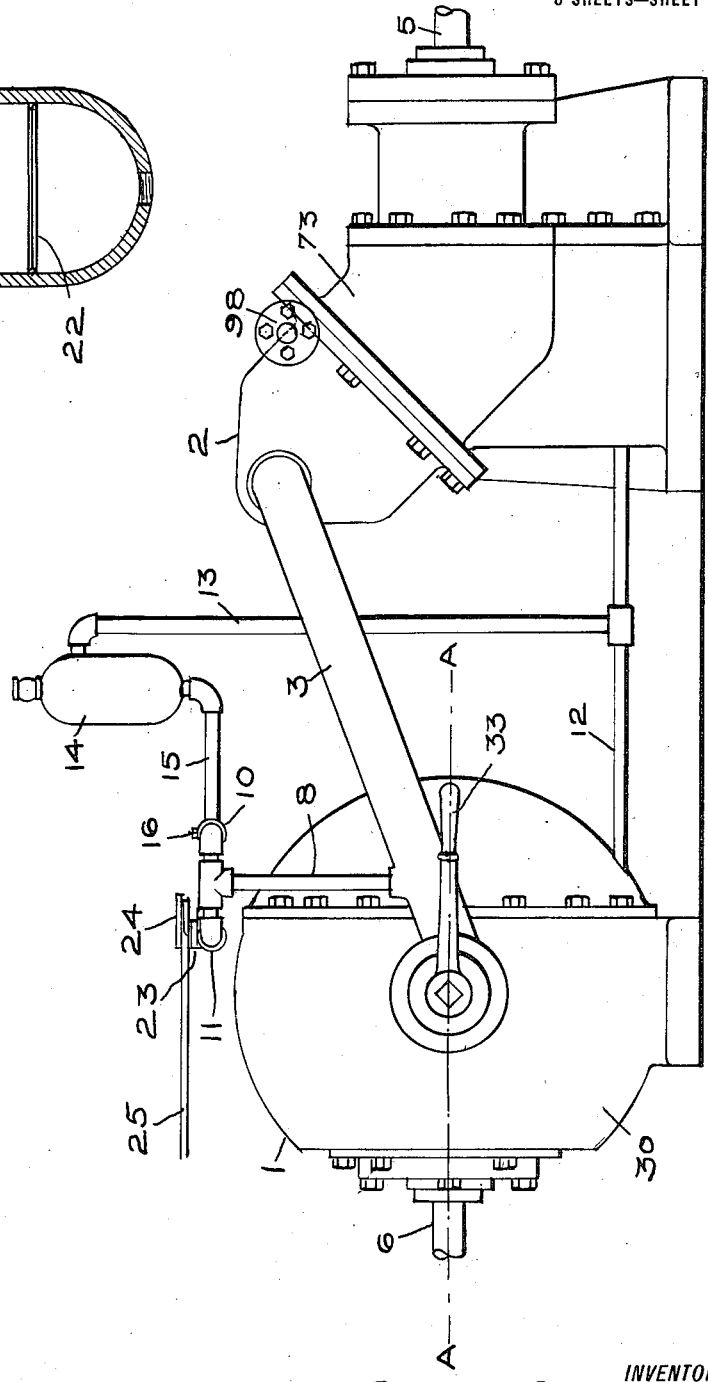

C. R. PRATT.
ROTARY PISTON POWER TRANSMISSION.
APPLICATION FILED JULY 26, 1910.
1,137,283.
Patented Apr. 27, 1915.
8 SHEETS—SHEET 5.
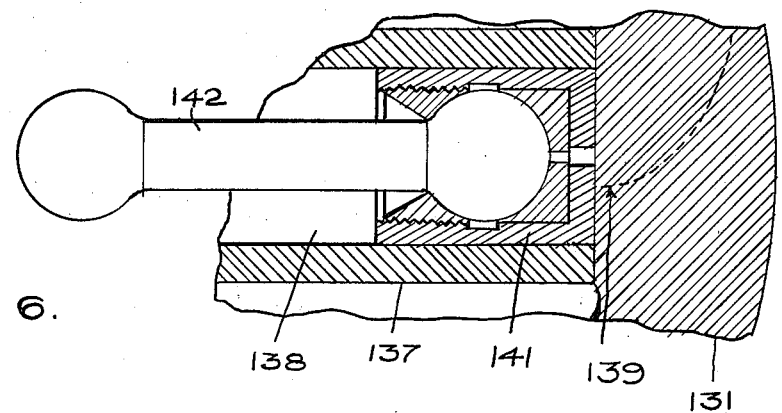
Fig. 6.
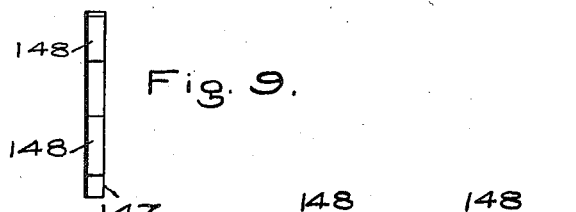
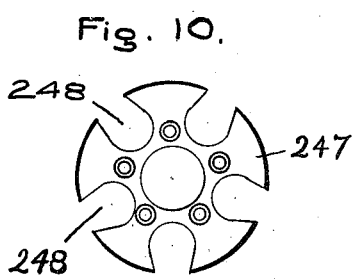
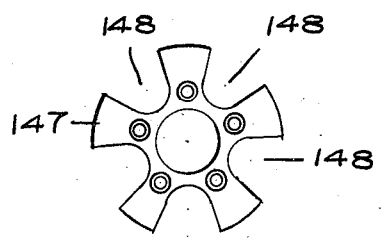
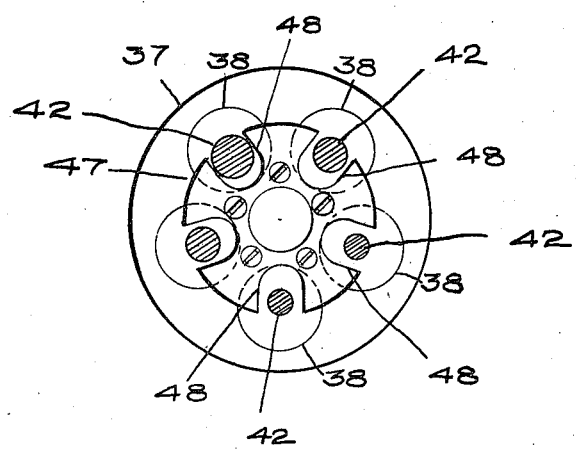
WITNESSES
Cornelius Zaluskie.
Frances E. Blodgett.
INVENTOR
Charles R. Pratt,
BY Russell M. Everett,
ATTORNEY

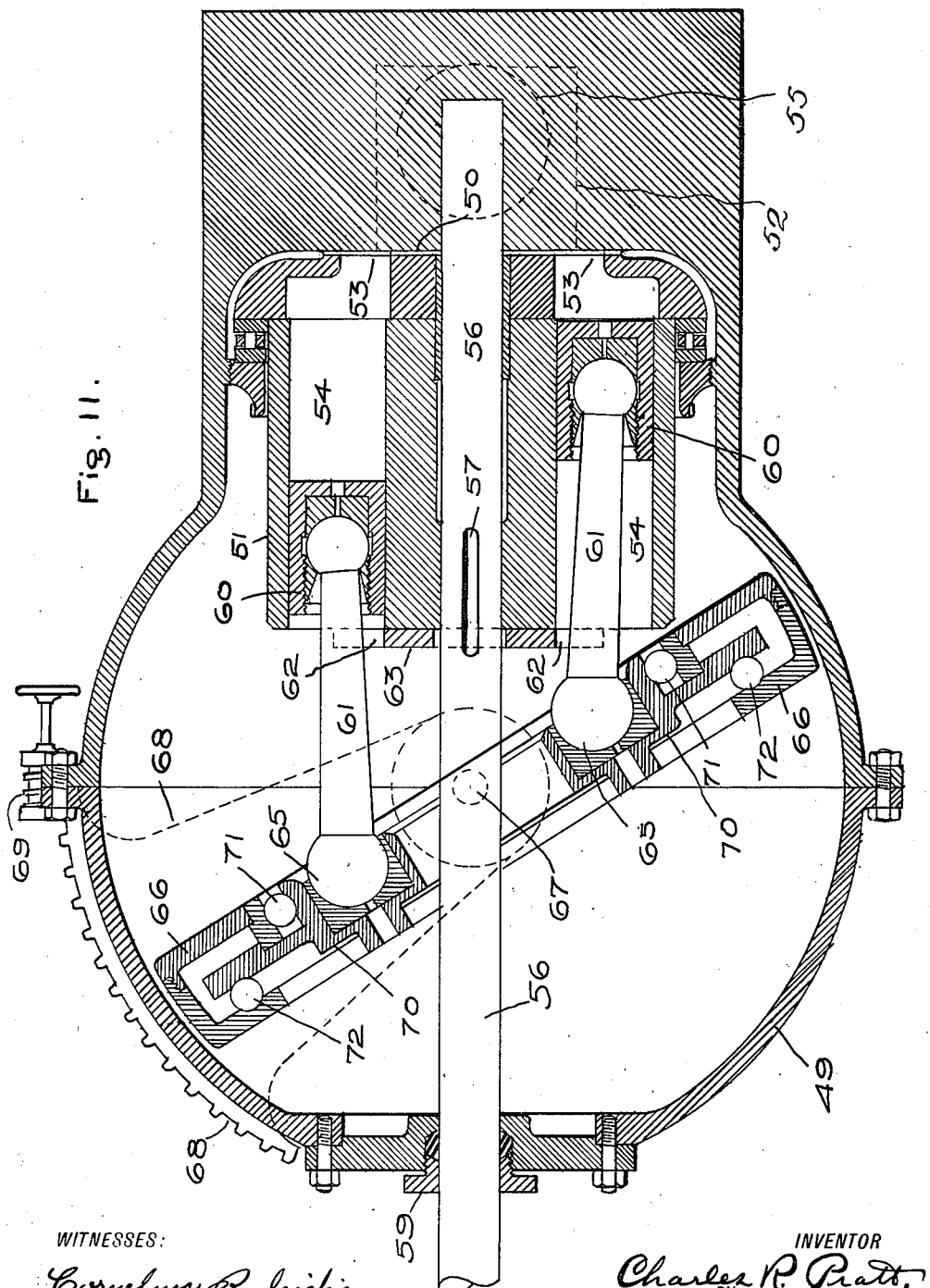

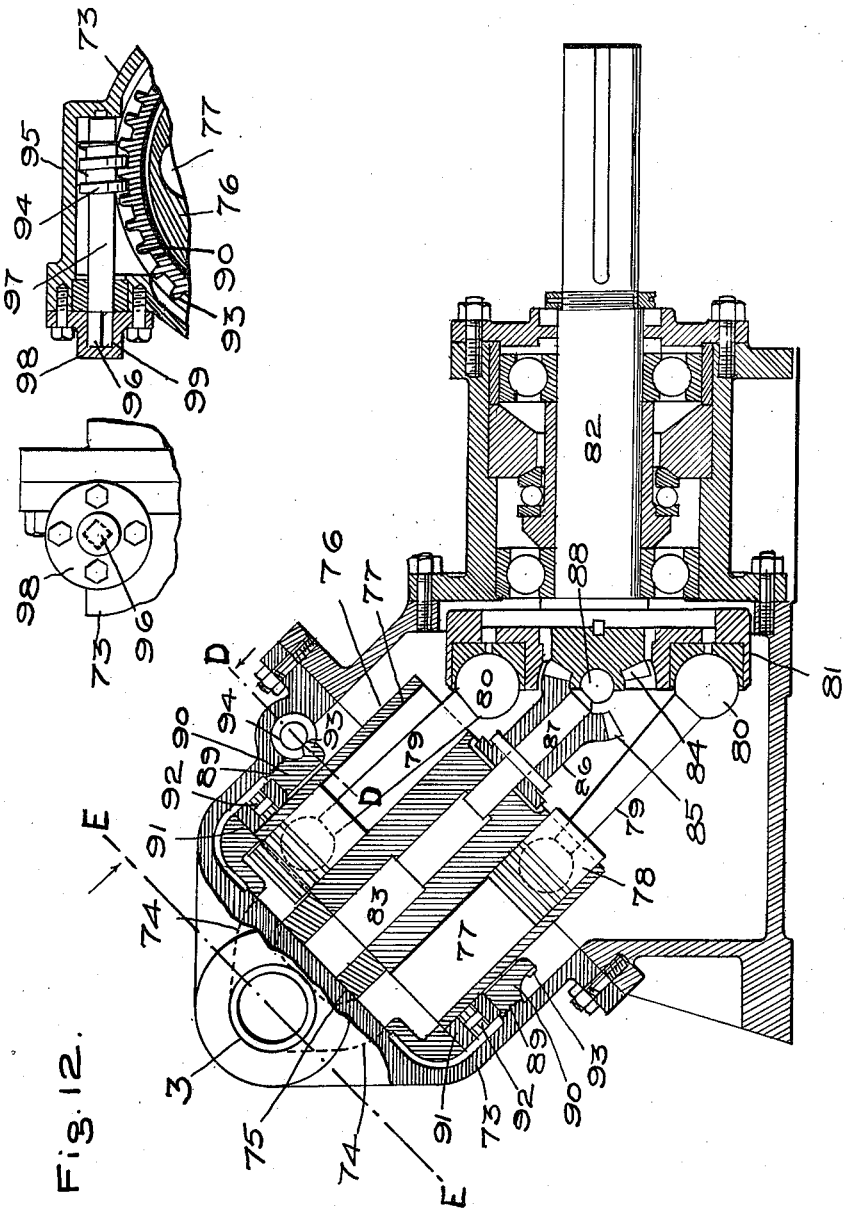

UNITED STATES PATENT OFFICE.

CHARLES R. PRATT, OF MONTCLAIR, NEW JERSEY, ASSIGNOR TO THE UNIVERSAL SPEED CONTROL COMPANY, A CORPORATION OF NEW YORK.

ROTARY-PISTON POWER TRANSMISSION.

1,137,283. Specification of Letters Patent. Patented Apr. 27, 1915.

Application filed July 26, 1910. Serial No. 573,970.

*To all whom it may concern:*

Be it known that I, CHARLES R. PRATT, a citizen of the United States, residing at Montclair, in the county of Essex and State of New Jersey, have invented certain Improvements in Rotary-Piston Power Transmission, of which the following is a specification.

The objects of this invention are to provide improved means for returning to the pump circuit fluid which leaks therefrom into the casings, and for keeping said pump circuit supplied against actual leakage; to provide automatic governing means to prevent the engine driving the pump from becoming overloaded; to secure simple means for rotating in synchronism the barrel containing the piston cylinders and the head to which said pistons are secured; to provide such synchronizing means which shall be positive, accurate and easily operated; to adapt such means to either a tilting barrel or tilting rotary head; to provide a rotary piston pump in which each cylinder shall be completely emptied upon each forward stroke of the piston; to provide improved means for holding the barrel properly and effectively seated, while permitting an adjustment of such seating, and to obtain other advantages and results as may be brought out in the following description.

Figure 1:
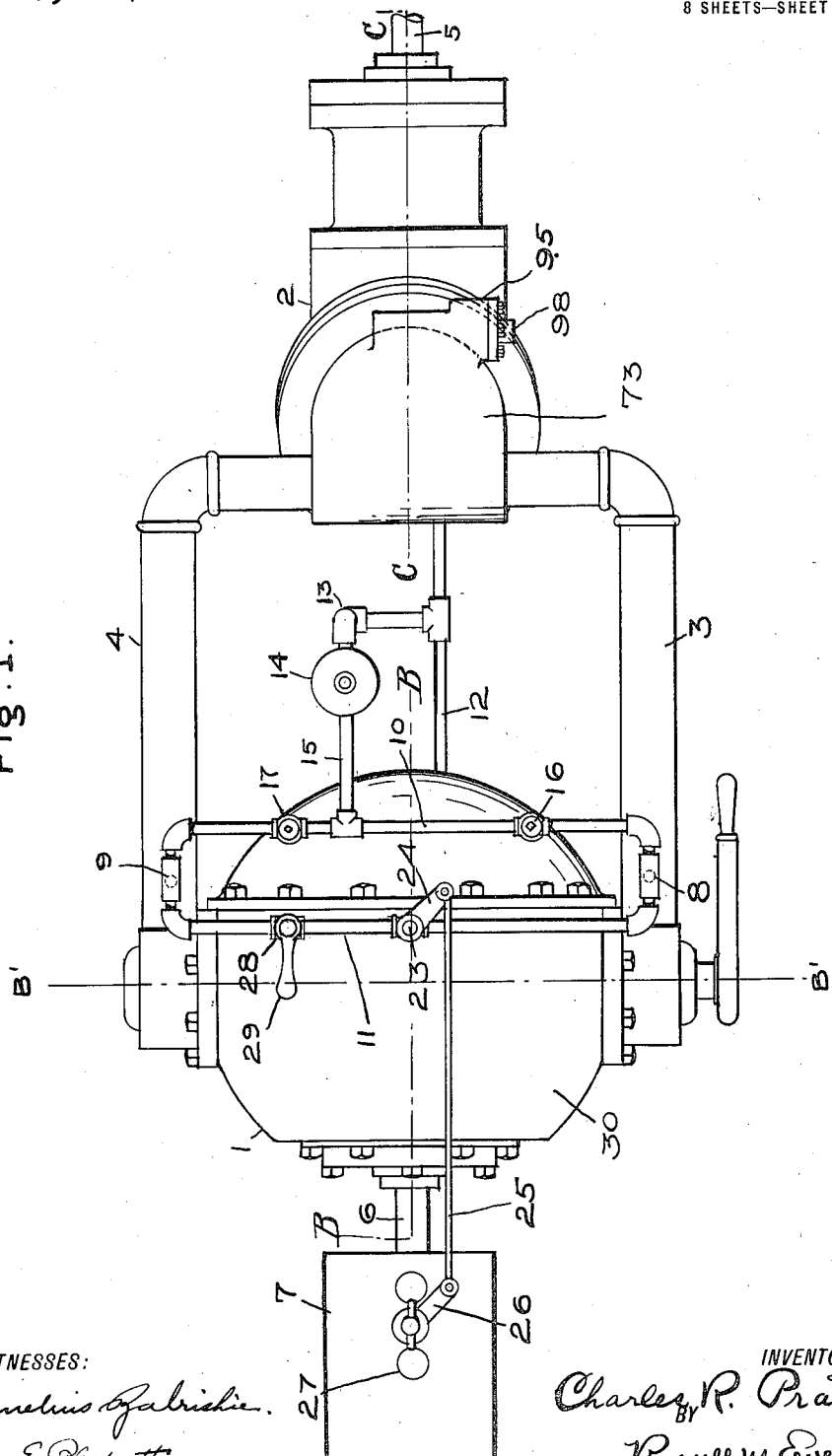
Figure 4:
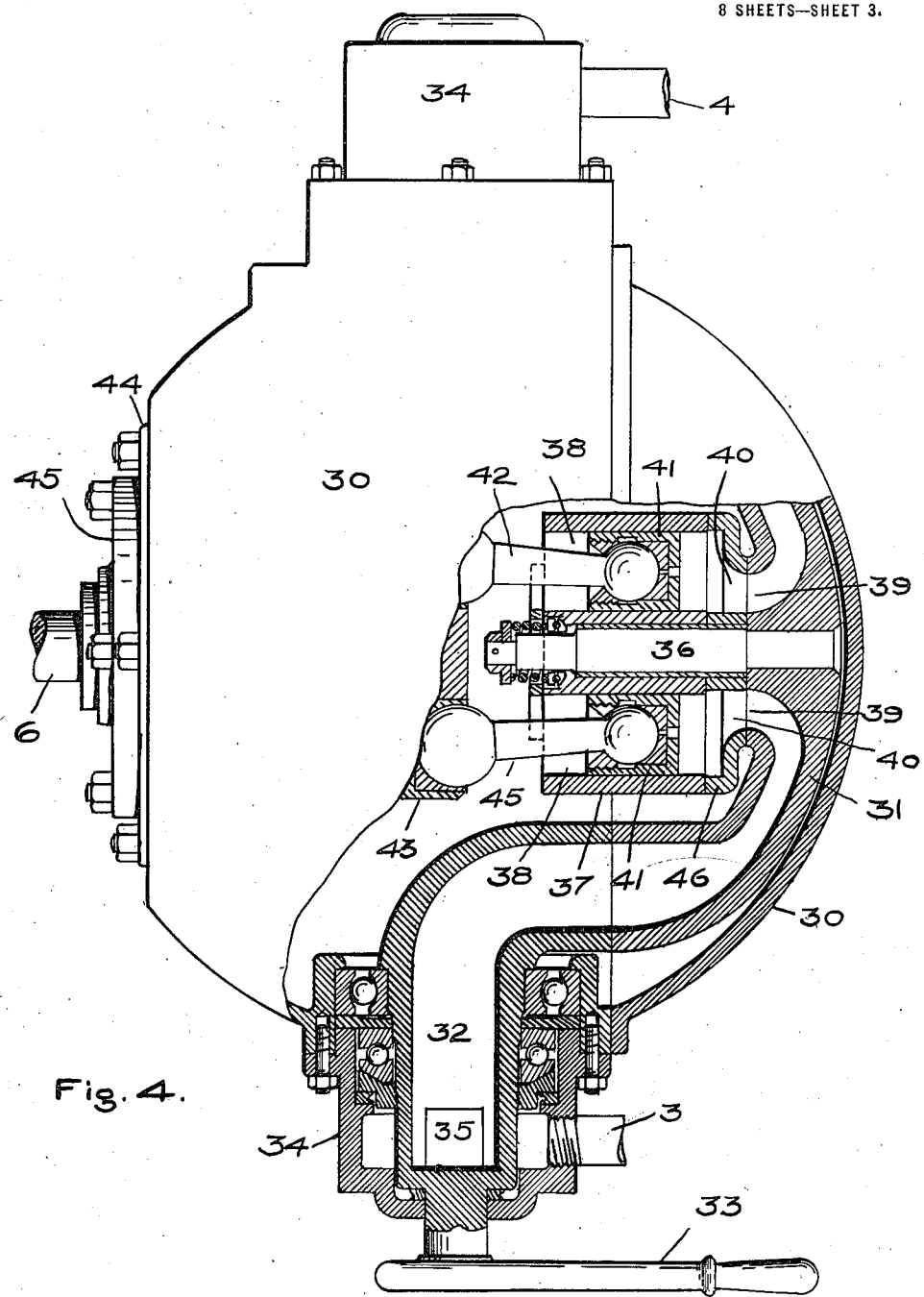
Figure 5:
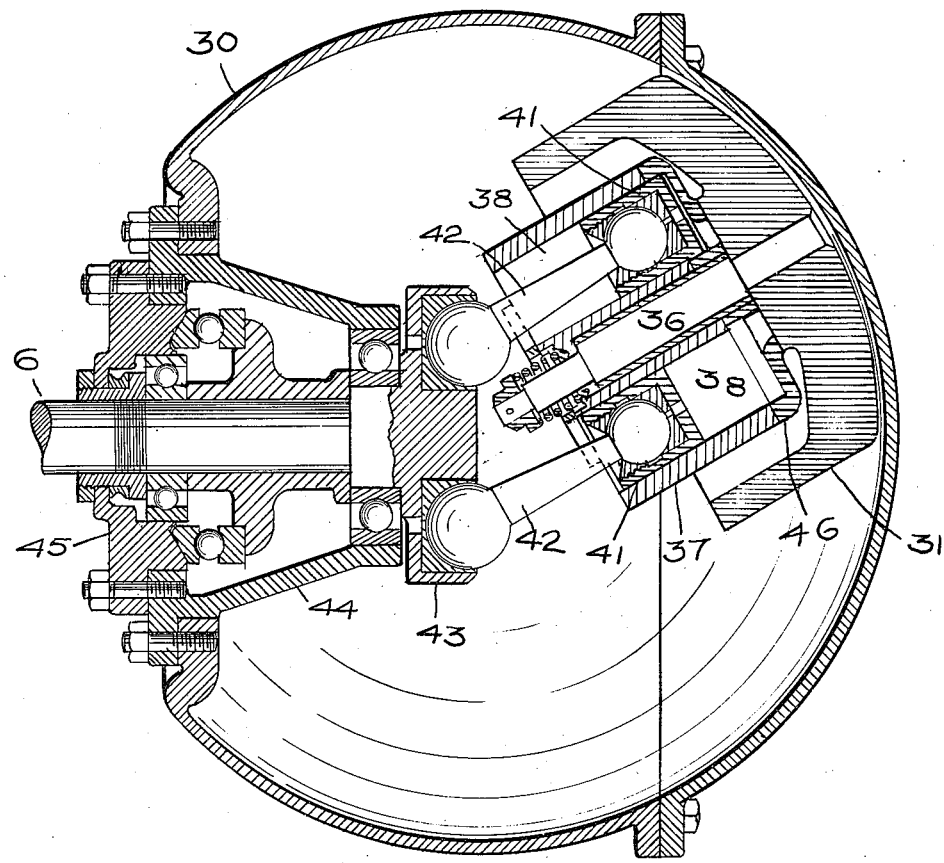
Figure 15:
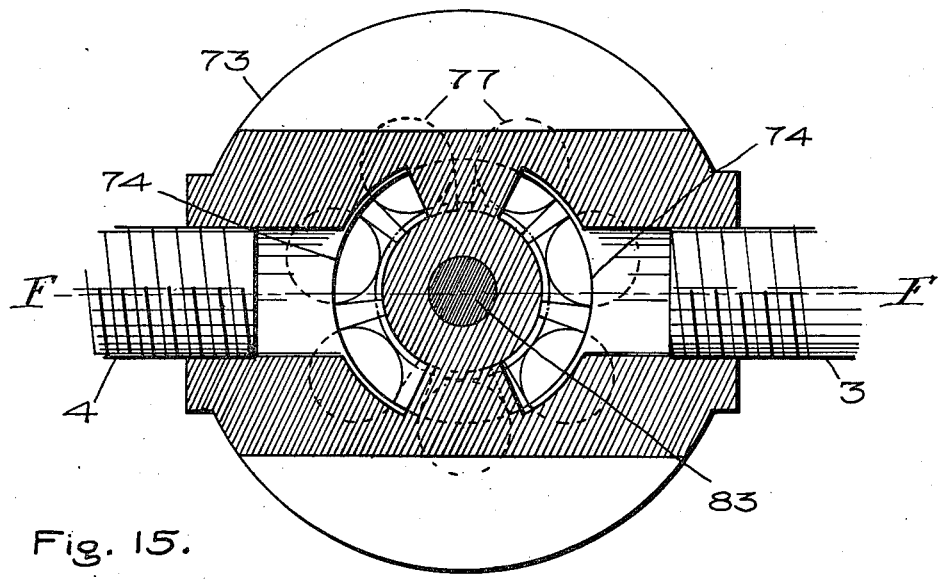
Figure 16:
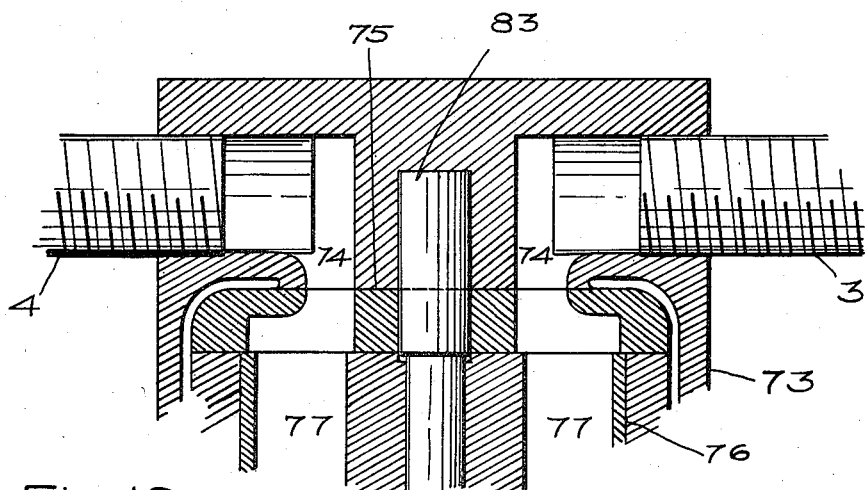

Referring to the accompanying drawings, in which like numerals of reference indicate the same parts throughout the several figures, Figure 1 is a plan of a rotary piston power transmission device of my improved construction, comprising a pump member and motor member with their connections, and showing diagrammatically an engine for supplying the power; Fig. 2 is a side elevation of the same, without the engine; Fig. 3 is a central vertical section of a certain fluid feed or supply reservoir; Fig. 4 is a partial horizontal central section of the pump member taken on line A—A of Fig. 2, but showing diametrically opposite piston cylinders for clearer illustration. Fig. 5 is a vertical central section of the pump member taken on line B—B of Fig. 1, also showing diametrically opposite cylinders; Fig. 6 is a detail sectional view of a single piston and adjacent parts, illustrating the scavenger stroke; Fig. 7 is an end view of the barrel of the pump member, showing the driving plate thereon; Fig. 8 is a face view of a modified driving plate, and Fig. 9 is an edge view of the same; Fig. 10 is a face view of another modification of the driving plate; Fig. 11 is a central longitudinal section of a pump member in which the rotary head to which the pistons are pivoted tilts instead of the barrel containing the pistons; Fig. 12 is a central vertical section of the motor member taken on line C—C of Fig. 1, showing diametrically opposite piston cylinders for clearer illustration; Fig. 13 is a detail section on line D—D of Fig. 12 of the adjustable barrel seating means; Fig. 14 is an outside view of the same, as shown in Fig. 2, but on larger scale; Fig. 15 is a cross-section taken on line E—E of Fig. 12, and Fig. 16 is a partial longitudinal section of the motor member on line F—F, Fig. 15, or at right angles to the section shown in Fig. 12, also with diametrically opposite cylinders.

In said drawings, 1 indicates the pump member of a power transmission device embodying my invention and 2 is the motor member, 3 and 4 indicating the pipes connecting said two members. The driven shaft 5 projects from said motor member 2, and a driving shaft 6 leads into the pump member 1, said driving shaft being adapted to be rotated by an engine 7 of any suitable and ordinary construction.

Since these two members of my power transmission device, the pump member and the motor member, are distinct units either of which could be used as a pump or as a motor, even without the other, I prefer to call them "units" instead of "members" and have done so throughout the remainder of the description and claims. Furthermore, since the characteristic feature of these units is the peculiar action resulting from the rotation of the series of pistons as a whole, I have called the units "rotary piston units," so that the term as used herein means a construction having such a rotating series of pistons, without regard to whether it is used as a pump or motor.

At opposite sides of the pump unit 1 pipes 8 and 9 extend upward, one from each of the circuit pipes 3 and 4, and at their upper ends said pipes 8 and 9 branch and carry parallel pipes 10 and 11 extending across the pump unit 1 above the same. Into one of these transverse pipes, as 10, the supply of oil or other liquid used in the fluid gear is fed.

A pipe 12 connects the casings of the pump and motor units 1 and 2, and from this connecting pipe an upright pipe 13 leads to the upper portion of an oil supply tank 14.

From the bottom of said tank 14 a pipe 15 extends to the transverse pipe 10 which leads at its opposite ends through the pipes 8 and 9 into the pump circuit pipes 3 and 4.

Check valves 16 and 17 are placed in the transverse pipe 10, on opposite sides of the connection of the pipe 15 from the supply tank 14, both said valves opening away from the said pipe 15, so that whichever side of the pump member is the exhaust side the oil supply will pass thereinto and pressure from the opposite side of the pump member will be stopped by the adjacent check valve. The fluid supply tank 14 is shown in detail in Fig. 3, where 18 indicates a transverse partition near the top of the tank having a passage 19 therein, and normally closed by a valve 20 pushed upward from beneath by a spring 21. It will be noted that the pipe 13 opens into the tank 14 below the said partition 18 and that between said inlet and the outlet for the pipe 15 at the bottom of the tank is a screen or strainer 22. This screen serves principally to stop any air which may be mixed with the fluid from passing on into the circuit, and it will be noted that said screen will stop the air bubbles coming with the inflow through pipe 13, so that they can float upward, without changing the direction of passage of the fluid. The oil or other fluid normally stands in the tank to a level somewhat above the partition 18, and above the top of the liquid the chamber of the tank is filled with compressed air which exerts its pressure upon the liquid. Obviously as the liquid leaks past the pistons in the cylinders in the pump and motor units and thus escapes from the pump circuit into the casings, it will return to the tank 14 and other oil be drawn from said tank to take its place. Actual leakage, or leakage from the pump and motor units outside their casings, is extremely slight and will be made up for by the passage of some liquid through the valve 20 of the supply tank by the force of the compressed air. The supply tank 14, except in the case of actual leakage serves simply as a means for connecting the pipes 13 and 15, which pipes are always completely full of liquid. Under such conditions the check valve 20 is necessary to prevent a sudden impulse of leakage through the pipe 13 from cushioning against the air in the top of the tank so that only part of the leakage goes into the pipe 15, the rest taking the place of the air compression. The check valve 20 insures that the pipes 13 and 15 are connected during ordinary leakage by a compartment with outwardly rigid walls and completely full of liquid.

The other transverse pipe 11 has in itself a shut-off valve 23 adapted to be operated by an arm 24 which is connected by a rod 25 to an arm 26 which is swung by the governor 27 of the engine 7. The valve 23 normally stands open so as to bypass the pump unit 1 and permit the pistons of the motor unit to move idly. The speeding of the engine 7 effects through its governor 27 a closure of the valve 23 by means of the arms 24 and 26 and connecting rod 25, so that the pump unit drives the motor unit. This governing the by-pass is especially desirable where the fluid gear is employed on an automobile or the like, so that when the machine is idle in the garage it can be pushed around at will, but just so soon as the engine speeds up on starting, it closes the bypass. If at any time the engine becomes overloaded and its speed slackens, the bypass valve 23 will open and relieve it.

A second by-pass valve 28 may be provided if desired, and operated by a lever 29 which can be connected to any suitable means for manually operating it. This enables the operator, where the invention is applied to an automobile, to utilize the entire device as a brake in coasting, the motor then becoming the pump and the pump unit the motor or driven unit, or the pump may be cut out of the circuit, as well as the engine stopped, so that the motor as a pump is free to run and circulate liquid through the bypass 11. Of course, the second bypass 28 can be used to advantage only when the first bypass 23 is open or the engine stopped, as in the coasting of an automobile just referred to.

The pump unit 1 is shown particularly in Figs. 4 and 5, and comprises a casing 30 which is substantially spherical at its end away from the driving shaft 6 and has at its opposite sides bearings for the horizontally disposed trunnions of a vertically swinging carrier 31. One of said trunnions is shown at 32 in Fig. 4, together with the lever 33 for swinging the carrier, and the bearing for said trunnion. Each trunnion has around it a cap 34 bolted to the casing 30, and the circuit pipes 3, 4 open into said caps, the trunnions being hollow and communicating with the caps by lateral openings, as 35. The carrier 31 has at its middle a pin 36 projecting toward the driving shaft 6 and adapted to be brought into alinement therewith, and upon said pin is rotatably mounted a barrel 37 having an annular series of longitudinal cylinder chambers 38. Said barrel seats against the carrier 31 around the pin 36 and at opposite sides of said pin are ports 39, 39 to which the ducts of the hollow trunnions lead. Each of the cylinders 38 has at its end a port 40 adapted to register with said ports 39, 39 as the barrel rotates, and of course the ports 39, 39 are elongated so as to communicate with a plurality of cylinders at once, being separated only by a wall thick enough to cut off each cylinder port from one carrier port before it opens into the other. In the cylinders 38 are pistons 41, the rods 42 of which connect by ball and socket joints to a head 43 fast on the driving shaft 6,—the centers of said ball-and-socket joints being in the plane indicated by line B'—B', Fig. 1. Said driving shaft is mounted upon suitable lateral and end-thrust bearings in an annular bracket 44 and closing cap 45 bolted to the casing 30, see Fig. 5, it being understood that the said casing is closed and full of oil or other pumping liquid.

In Figs. 4 and 5 the barrel 37 is shown as having next its seat upon the carrier 31 an end portion 46 in which the ports 40 are formed which connect the cylinders with the ports 39, 39 in the carrier, said ports 40 changing in cross-sectional area or shape between the ends of the cylinders and the carrier seat, as is sometimes desired for throttling. This end portion 46 of the barrel in which the cylinder ports vary from the cylinders may be dispensed with, however, and the cylinders continue right up to the carrier, as shown in Fig. 6, where the different parts are marked with the same numerals of reference as in Figs. 4 and 5 each with a figure 1 prefixed. By this construction each piston 141 continues its stroke clear up to the plane of the carrier seat, which it may engage in sliding contact as the cylinder passes from one port 139 of the carrier to the other. There is thus a total expulsion of the contents of the cylinder, by what may be called a scavenger stroke, instead of only a partial expulsion by the construction shown in Figs. 4 and 5 and the modified construction of Fig. 6 is particularly adapted to some special kinds of pumping.

In order to cause the barrel 37 to always positively rotate with the head 43 on the driving shaft, a plate 47 is fixed upon the end of the barrel 37 concentric therewith, which plate has radial notches 48 adapted to receive the piston rods 42, see Fig. 7 more particularly. Preferably, the notches of the end plate and the rods of the pistons are so related that the rods engage the walls of the notches or slots to drive the barrel, only when the pistons are at the innermost points of their strokes. This insures that only one piston rod, namely the piston rod at that side of the barrel which is swung toward the rotary head, is driving the barrel at any single instant. This piston is obviously at the limit of its stroke inwardly into the cylinder, and hence engages the wall of the slot of the end plate at the closest possible point to its ball-and-socket connection to the rotary head 43. It is in this position that the piston rod is best adapted to exert a turning pressure upon the rotary barrel, as will be obvious. An inspection of Fig. 5 of the drawings will make this explanation clear and show that the lowest piston rod can exert little if any pressure to turn the barrel, while the upper one is in best position to do so and intermediate pistons are changing from one position to the other.

One way of causing each piston rod to exert a turning pressure upon the barrel only at that point where the barrel and rotary head most closely approach each other, is to have the piston rods tapered, as shown, from the rotary head toward the pistons, so that as they slide through the slots 48 of the end plate 47 they fit more tightly therein at their innermost position. This is illustrated in Fig. 7 of the drawings, as well as in Figs. 4 and 5.

The shape of the slots or notches in the end plate may also vary, as for instance in Fig. 8 I have shown slots or notches 148 which flare radially outward, while in Fig. 10, I have shown slots or notches 248 whose side walls converge radially inward. The slots or notches might be otherwise modified to secure a close fit against the piston rods at their innermost points of inward movement into the cylinders, and under some conditions the piston rods may be cylindrical or straight instead of tapered, as shown in Fig. 6.

In Fig. 11 I have illustrated a pump in which the stroke of the pistons is controlled by a tilting head 70, the barrel being keyed upon the driving shaft to rotate therewith and being provided with an end plate which engages the piston rods to impart rotation to the tilting head 70, as rotation was imparted to the barrel in the construction just described. In said Fig. 11, 49 is the casing providing an interior seat 50 for the barrel 51 and having ports 52 opening through said seat to register with the ports 53, 53 of the cylinders 54 of the said barrel. The ports 53, 53 connect with ducts 55, 55, one of which is the outlet and the other the inlet for the fluid pumped. A driving shaft 56 extends axially through the barrel 51, being keyed thereto, as at 57, and has bearings 58, 59 in the casing. In the cylinders 54 are pistons 60 with rods 61 extending through the slots 62 of an end plate 63, said rods being connected at their opposite ends to the head 70 by means of ball-and-socket joint 65. The said head 70 is rotatably mounted in a non-rotatable frame or portion 66 which is pivoted by trunnions 67 at its opposite ends in the walls of the casing 49, one of said trunnions extending through the casing and receiving outside a toothed segment 68 engaging a fixed screw or worm 69 mounted upon the outside of the casing. By swinging the toothed segment 68, obviously the controlling head 70 is tipped into different angular positions as viewed in Fig. 11. The rotary head is mounted in the frame 66 upon suitable bearings 71 and 72 adapted to take the centrifugal and end thrusts, respectively, and has a central aperture through which the driving shaft 56 passes.

It will be understood that by the construction above described the head 70 can be tipped into different planes to vary the stroke of the pistons, and yet will be always caused to rotate with the barrel 51 by reason of the end plate 63 on said barrel engaging the piston rods 61. Obviously, therefore, whether a barrel is tilted with respect to its rotary head or a rotary head is tilted with respect to its cylinder barrel, my improved end plate may be employed to cause the tilting part to rotate in synchronism with other parts.

The motor unit 2 of the fluid gear which I have shown comprises a casing 73 into which the pipes 3 and 4 lead, by means of the ports 74, 74 opening through an interior seat 75 provided by the casing for the barrel 76. This barrel has a plurality of cylinders or chambers 77 each having a piston 78 whose rod 79 is connected at its outer end by a ball-and-socket joint 80 to a head or disk 81 fast on the driven shaft 82 to rotate therewith. Said shaft 82 is provided in the casing 73 or an extension thereof with suitable anti-friction bearings to take lateral and end thrust and enable said shaft to turn easily. The barrel 76 rotates upon a central pin 83 projecting from the seat 75, and since said barrel is always held with its axis of rotation at a given angle to the shaft 82, there is no need for my improved end plate to transmit motion between the rotary head 81 and barrel 76, although said end plate could be employed if desired. It is simpler to form upon the rotary head 81 a bevel gear 84 which meshes with another bevel gear 85 connected to the barrel 76 so as to rotate therewith. In practice the bevel gear 85 is upon a sleeve 86 fast to a pin 87 which at one end has a bearing in the end of the barrel 76, and at its other end has a ball 88 fitted to a socket in the center of the driving head 81 or shaft 82 therefore. The sleeve 86 engages the barrel 76 nonrotatably, although longitudinally movable with respect thereto to permit adjustment of said barrel toward and away from its seat 75.

For adjusting the said barrel 76 with respect to the seat 75 of the casing, I have shown the casing interiorly threaded, as at 89, and adapted to receive a correspondingly-threaded interior ring 90 which thus lies inside the casing 73 around the rotary barrel 76. Said rotary barrel has near its base an exterior annular shoulder or flange 91 opposed to the inner end of the ring 90, and between these two surfaces is arranged a roller bearing 92 or other equivalent antifriction means. Thus by screwing the ring 90 toward the seat 75 of the casing, the rotary barrel 76 will obviously be forced toward said seat, and such pressure being distributed around a ring of large diameter upon the outside of the rotary barrel, said barrel is held firmly to its seat in very stable position.

For turning the said screw ring 90, it is provided at its outer edge with exterior gear teeth 93 adapted to be engaged by a worm 94 which is mounted in an extension 95 of the casing with a squared end 96 of its shaft 97 projecting therefrom to receive a wrench or the like for turning. To prevent inadvertent turning of the worm 94, a cap 98 having a socket 99 fitting said squared end 96, is bolted to the casing or extension 95 thereof to cover said projecting shaft end at all times except when adjustment is being made.

It will be understood that the use of my improved end plate 47 makes the piston rods 42 transmit rotary motion from the driven rotary part or member to the other one, and thus said piston rods perform a double function. This tends to create simplicity and economy in construction, and by taking the necessary lateral pressure from said piston rods as described a very effective transmission of rotary motion is obtained. It should be carefully noted that each piston operates to transmit rotation only when it is at that side of the barrel which is tipped toward the other rotary member or toward which the other rotary member is tipped. In other words, each piston transmits rotation during only a small arc of its revolution when it is passing through the angle between the axes of the two rotary parts or members. Obviously there is an instant at which one piston alone is transmitting rotation by its lateral pressure, and then the next succeeding piston begins to also operate, until the two are together transmitting the rotation; the work of such transmission then passes gradually but entirely to the second piston, which in another instant begins to share it with the next succeeding or a third piston. At the opposite side of the barrel or the side away from the angle between the axes of the rotary members, the piston rods are idle as to any lateral pressure. The result of this is that during the greater part of the stroke of each piston that particular piston is doing no work to turn the cylinder barrel, and it is only when the piston is near the innermost point of its stroke that it transmits rotation. The advantages of this are that rotation is transmitted laterally by a given piston rod when its longitudinal motion is near the minimum, and also when the leverage of the piston rod is such as to transmit such rotation with the least lateral pressure of the piston on the side walls of its cylinder. In other words, the rotary motion is usually transmitted between the two rotary parts by that piston or those pistons which are extending farthest into the barrel and thus have the shortest projecting portions, affording the least lost motion. The nearer the axes of the two rotary members are to alinement with each other the longer the interval during which any one piston transmits rotation, until when the axes are in alinement obviously all the piston rods must transmit rotation equally.

Other means than I have described may be found for securing the rigidity of each piston with respect to the barrel temporarily during each of its revolutions, and I do not wish to be understood as limiting myself to the specific construction set forth. Any means by which an effective transmission of rotary motion from one rotary member to the other through the piston rods, is within the spirit and scope of my invention.

Obviously, by my piston drive, or construction whereby rotary motion is transmitted between the barrel and rotary head through the piston rods, it is necessary that said piston rods be pivoted to the pistons and rotary head so that there can be no lateral shifting of the engaging parts with respect to each other at the points of pivoting, notwithstanding perfect freedom of angular motion. In other words, the ends of the piston rods are each pivoted to a piston so that it cannot move laterally with respect thereto, and similarly the opposite end of each piston rod is pivoted to the rotary head so that it cannot move with respect thereto in the plane of said head, although of course the piston rod is free to swing angularly with respect to both piston and rotary head. This relation is most clearly expressed by saying that the piston rods are pivoted at their ends to fixed points of the pistons and rotary head, because if their points of pivoting could shift with respect to the parts to which they are pivoted, there could be no transmission of rotary motion through the piston rods on account of such shifting or lost motion, it being understood that the transmission of such rotary motion depends upon resistance to the natural tendency of the rotary head as driving member to turn or twist away from the pistons in the barrel. This resistance is met by my improved driving plate, the opposite ends of the piston rods being fixed as above described with respect to the parts to which they are pivoted. Or, if the driving plate were removed, the resistance would be met by engagement of the piston rods laterally with the walls of the mouths of the cylinders, there being a lag or drag of the barrel and its pistons in this case behind the rotary head, angularly, due to the looseness of the piston rods in the mouths of the cylinders.

Having thus described the invention, what I claim is:

1. The combination with a rotary piston unit having a closed casing, a barrel in said casing having a cylinder, an inlet and an outlet leading to said cylinder, a piston in said cylinder, and means for reciprocating said piston, of a fluid reservoir, a duct leading from the unit casing to the upper part of said reservoir, another duct leading from the lower part of said reservoir to the cylinder inlet, and a screen in the reservoir between the inlet of said first-mentioned duct and the outlet of said second mentioned duct arranged and adapted to permit the flow of fluid from the said inlet to the outlet and to strain out air bubbles and allow the same to rise in the reservoir.

2. The combination with a rotary piston unit having a closed casing, a barrel in said casing having a cylinder, an inlet and an outlet leading to said cylinder, a piston in said cylinder, and means for reciprocating said piston, of a fluid reservoir, a duct leading from the unit casing to the upper part of the reservoir, another duct leading from the lower part of said reservoir to the cylinder inlet and a screen arranged in the reservoir transversely of the direction of flow between said upper and lower ducts so as to permit air bubbles to rise from its side toward the said inlet.

3. The combination with a rotary piston unit having a closed casing, a barrel in said casing having a cylinder, inlet and exhaust pipes leading through the casing to said cylinder, a piston in said cylinder, and means for reciprocating the same, of a reservoir adapted to contain liquid and having a compartment with an inwardly opening check valve in the wall thereof, a duct leading from said compartment to the inlet pipe, a second duct leading from the unit casing to said compartment, and means for introducing pressure into said reservoir.

4. The combination with a rotary piston unit having a closed casing, a barrel in said casing having a cylinder, inlet and exhaust pipes leading through the casing to said cylinder, a piston in said cylinder, and means for reciprocating the same, of a reservoir adapted to contain liquid and having a compartment with an inwardly opening check valve in the wall thereof, a duct leading from said compartment and having branches connected to the inlet and exhaust pipes, respectively, check valves in said branches opening toward the unit, a second duct leading from the unit casing to said compartment of the reservoir, and means for introducing pressure into said reservoir.

5. The combination with a rotary piston unit having a closed casing, a barrel in said casing having a cylinder, inlet and exhaust pipes leading through the casing to said cylinder, a piston in said cylinder, and means for reciprocating the same, of a reservoir adapted to contain liquid and having a compartment with an inwardly opening check valve in the wall thereof, a duct leading from said compartment to the inlet pipe, and a second duct leading from the unit casing to said compartment.

6. In a rotary piston power transmission device, the combination with a pump member and a motor member, each comprising a casing, a barrel providing a cylinder, a piston and means for reciprocating said piston, and circuit pipes connecting said cylinders, of a reservoir adapted to contain liquid and having a compartment with an inwardly opening check valve in the wall thereof, a duct leading from said compartment and having branches connected to the circuit pipes, check valves in said branches opening toward the pump, a second duct connecting the casings of the two members, and a tube leading from the said second duct to the closed compartment of said reservoir.

7. The combination with a rotary piston unit having a closed casing, a barrel in said casing having a cylinder, inlet and exhaust pipes leading through the casing to said cylinder, a piston in said cylinder, and means for reciprocating the same, of a reservoir adapted to contain liquid and having a compartment with an inwardly opening check valve in the wall thereof, a duct leading from said compartment and having branches connected to the inlet and exhaust pipes, respectively, check valves in said branches opening toward the unit, and a second duct leading from the unit casing to said compartment.

8. The combination with a rotary piston unit having a closed casing, a barrel in said casing having a cylinder, an inlet and an outlet leading to said cylinder, a piston in said cylinder, and means for reciprocating said piston, of a fluid reservoir, a duct leading from the unit casing to the upper part of said reservoir, another duct leading from said lower part of said reservoir to the cylinder inlet, and a screen arranged transversely of the interior chamber of said reservoir between the inlet and outlet of said ducts, whereby the flow is downward through said screen and air-bubbles can escape upward from the upper side of the screen.

9. In a rotary piston power transmission device, the combination with a pump unit and a motor unit, each comprising a casing, a barrel providing a cylinder, a piston and means for reciprocating said piston, and circuit pipes connecting said cylinders, of a reservoir adapted to contain fluid and having a compartment with an inwardly opening check valve in the wall thereof, a duct leading from said compartment into the pump circuit, a second duct connecting the casing of the two units, and a tube leading from the said second duct to the closed compartment of said reservoir.

10. In a rotary piston power transmission device the combination with a pump unit and a motor unit, each comprising a casing, a barrel providing a cylinder, a piston and means for reciprocating said piston, and circuit pipes connecting said cylinders, of a reservoir adapted to contain fluid and having a compartment with an inwardly opening check valve in the wall thereof, a duct leading from said compartment and having branches connected to the circuit pipes, check valves in said branches opening toward the pump, a second duct connecting the casing of the two units, and a tube leading from the said second duct to the closed compartment of said reservoir.

11. In a rotary piston unit, the combination of a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and means for transmitting rotary motion to the other member from one or more of said piston rods.

12. In a rotary piston unit, the combination of a rotary head, a rotary barrel having a plurality of longitudinal cylinders, pistons in said cylinders, rods connecting said pistons to said rotary head, means for rotating one of said rotary members, the other rotary member being rotatably connected with said rotated member through the said piston rods, and means for holding said rotary members with their axes at an angle to each other.

13. In a rotary piston unit, the combination of a rotary head, a rotary barrel having a plurality of longitudinal cylinders, pistons in said cylinders, rods connecting said pistons to said rotary head and adapted to transmit rotary motion between said rotary members each at a portion of its reciprocation and to free itself of such transmission at another portion, means for rotating one of said rotary members, and means for holding said rotary members with their axes at an angle to each other.

14. In a rotary piston unit, the combination of a rotary head, a rotary barrel having a plurality of longitudinal cylinders, means for rotating one of said rotary members, means for holding said rotary members with their axes at an angle to each other, pistons in said cylinders of the rotary barrel, and rods connecting said pistons to said rotary head, said rods adapted to transmit rotary motion between said rotary members at the inner portions of their reciprocations and to free themselves from such transmission in their outer positions.

15. In a rotary piston unit, the combination of a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and means on one of said rotary members adapted to laterally engage the said piston rods.

16. In a rotary piston unit, the combination of a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and a plate on one of said rotary members adapted to engage the piston rods.

17. In a rotary piston unit, the combination of a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and means at the end of said barrel next the other rotary member for laterally engaging the piston in its innermost position.

18. In a rotary piston unit, the combination of a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and a plate on the said barrel having slots adapted to receive the rods of said pistons.

19. In a rotary piston unit, the combination of a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and a plate on the said barrel having radial slots adapted to receive the rods of said pistons.

20. In a rotary piston unit, the combination with a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and a plate on the end of the said barrel having radially disposed slots each having substantially parallel opposite portions of its walls adapted to receive and hold one of said piston rods between themselves.

21. In a rotary piston unit, the combination with a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and a plate on the end of said barrel having radial slots receiving the said piston rods, each slot adapted at its outer end to fit its piston rod at the innermost point of the stroke thereof.

22. In a rotary piston unit, the combination with a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and a plate on the end of the barrel adapted to engage each of said piston rods at all parts of the path of travel of said rods where they are in operative position to transmit rotation.

23. The combination of inlet and outlet ducts, a rotary barrel having cylinders adapted to communicate with said ducts, a rotary head, pistons in said cylinders having the outer ends of their rods connected to said head, mountings each rotatably supporting one of said rotary members independently of the other, means for moving one rotary member to vary the angular relation of its axial line to that of the other, means for driving one of said rotary members, and means for transmitting rotary motion to the other member from one or more of said piston rods.

24. The combination of inlet and outlet ducts, a barrel having chambers adapted to communicate with said ducts, a prime mover, pistons in said chambers having rods connected to said prime mover, means for varying the angular relation of the axis of said barrel to the axis of said prime mover, and means for transmitting rotary movement to said barrel from said piston rods.

25. In a rotary piston unit, the combination of a rotary head, a rotary barrel having a plurality of longitudinal cylinders, pistons in said cylinders, rods connecting said pistons to said rotary head and laterally enlarged adjacent to said rotary head to transmit rotation between said head and barrel at the inner ends of their strokes and free themselves therefrom at the outer end, means for holding said rotary members with their axes at an angle to each other, and means for rotating one of said rotary members.

26. In a rotary piston unit, the combination of a rotary head, a rotary barrel having a plurality of longitudinal cylinders, pistons in said cylinders, rods connecting said pistons to said rotary head and laterally enlarged adjacent to said rotary head, means on said barrel adapted to be engaged by the lateral enlargements of the pistons and transmit rotary motion, means for holding said rotary members with their axes at an angle to each other, and means for rotating one of said rotary members.

27. The combination with a casing providing a seat with inlet and outlet ports therein, a rotary barrel mounted endwise on said seat and having an annular series of longitudinal cylinders, a rotary head opposite one end of said barrel, a shaft arranged axially of one of said rotary members and rotatably connected thereto, pistons in the cylinders of said barrel, rods pivoted at their ends to fixed points of the pistons and rotary head respectively, means for holding said rotary members with their axes at an angle to each other, and means for transmitting rotary motion between said barrel and head through the said piston rods.

28. In a rotary piston unit, the combination of a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and means on one of said rotary members adapted to laterally engage the said piston rods.

29. In a rotary piston unit, the combination of a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and a plate on one of said rotary members adapted to engage the piston rods.

30. In a rotary piston unit, the combination of a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and means at the end of said barrel next the other rotary member for laterally engaging the piston in its innermost position.

31. In a rotary piston unit, the combination of a rotary head, a rotary barrel having a plurality of longitudinal cylinders, pistons in said cylinders, rods connecting said pistons to said rotary disk, means for swinging said rotary barrel to vary the angular relation of its axis to the axis of the rotary head, means for rotating one of said rotary members, and a plate on the said barrel having slots adapted to receive the rods of said pistons.

32. In a rotary piston unit, the combination of a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and a plate on the said barrel having radial slots adapted to receive the rods of said pistons.

33. In a rotary piston unit, the combination with a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and a plate on the end of the said barrel having radially disposed slots each having substantially parallel opposite portions of its walls adapted to receive and hold one of said piston rods between themselves.

34. In a rotary piston unit, the combination with a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and a plate on the end of said barrel having radial slots receiving the said piston rods, each slot adapted at its outer end to fit its piston rod when at the innermost point of its stroke in its cylinder.

35. In a rotary piston unit, the combination with a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and a plate on the end of the barrel adapted to engage each of said piston rods at all parts of the path of travel of said rods where they are in operative position to transmit rotation.

36. In a rotary piston unit, the combination of a rotary head, a rotary barrel having a plurality of longitudinal cylinders, pistons in said cylinders, rods connecting said pistons to said rotary head and laterally enlarged adjacent to said rotary head to transmit rotation between said head and barrel at the inner ends of their strokes and free themselves therefrom at the outer end, means for swinging said rotary barrel to vary the angular relation of its axis to the axis of the rotary head, and means for rotating one of said rotary members.

37. In a rotary piston unit, the combination of a rotary head, a rotary barrel having a plurality of longitudinal cylinders, pistons in said cylinders, rods connecting said pistons to said rotary head and laterally enlarged adjacent to said rotary head, means on said barrel adapted to be engaged by the lateral enlargements of the pistons and transmit rotary motion, means for swinging said rotary barrel to vary the angular relation of its axis to the axis of the rotary head, and means for rotating one of said rotary members.

38. In a rotary piston unit, the combination of a rotary head, a rotary barrel having a plurality of longitudinal cylinders, pistons in said cylinders, rods pivoted at their ends to fixed points of the pistons and rotary head respectively, means for holding said rotary members with their axes at an angle to each other, means for rotating one of said rotary members, and means for transmitting rotary motion to the other member from one or more of said piston rods.

39. In a rotary piston unit, the combination of a rotary head, a rotary barrel having a plurality of longitudinal cylinders, pistons in said cylinders, rods pivoted at their ends to fixed points of the pistons and rotary head respectively, means for rotating one of said rotary members, the other rotary member being rotatably connected with said rotated member through the said piston rods, and means for holding said rotary members with their axes at an angle to each other.

40. In a rotary piston unit, the combination of a rotary head, a rotary barrel having a plurality of longitudinal cylinders, pistons in said cylinders, rods pivoted at their ends to fixed points of the pistons and rotary head respectively, means for holding said rotary members with their axes at an angle to each other, means for rotating one of said rotary members, and means at the end of said barrel next the other rotary member for laterally engaging the piston rod in its innermost position.

41. The combination of inlet and outlet ducts, a rotary barrel having cylinders adapted to communicate with said ducts, a rotary head, pistons in said cylinders, rods pivoted at their ends to fixed points of the pistons and rotary head respectively, mountings each rotatably supporting one of said rotary members independently of the other, means for moving one rotary member to vary the angular relation of its axial line to that of the other, means for driving one of said rotary members, and means for transmitting rotary motion to the other member from one or more of said piston rods.

42. In a rotary piston unit, the combination of a rotary head, a rotary barrel having a plurality of longitudinal cylinders, pistons in said cylinders, rods pivoted at their ends to fixed points of the pistons and rotary head respectively, means for holding said rotary members with their axes at an angle to each other, means for rotating one of said rotary members, and means connected to one of said rotary members and adapted to laterally engage the said piston rods to transmit rotation to the other member.

43. In a rotary piston unit, the combination of a rotary head, a rotary barrel having a plurality of longitudinal cylinders, pistons in said cylinders, rods pivoted at their ends to fixed points of the pistons and rotary head respectively, means for holding said rotary members with their axes at an angle to each other, means for rotating one of said rotary members, and a plate connected to one of said rotary members and adapted to engage the piston rods to transmit rotation to the other member.

44. In a rotary piston unit, the combination of a rotary head, a rotary barrel having a plurality of longitudinal cylinders, pistons in said cylinders, rods pivoted at their ends to fixed points of the pistons and rotary head respectively, means for holding said rotary members with their axes at an angle to each other, means for rotating one of said rotary members, and a plate rotatably fast with respect to said barrel having slots adapted to receive the rods of said pistons.

45. In a rotary piston unit, the combination of a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and a plate rotatably fast with respect to said barrel having radial slots adapted to receive the rods of said pistons.

46. In a rotary piston unit, the combination with a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and a plate rotatably fast with respect to said barrel having radially disposed slots each having substantially parallel opposite portions of its walls adapted to receive and hold one of said piston rods between themselves.

47. In a rotary piston unit, the combination with a rotary head, a rotary barrel having a plurality of longitudinal cylinders, pistons in said cylinders, rods connecting said pistons to said rotary head, means for holding said rotary members with their axes at an angle to each other, means for rotating one of said rotary members, and a plate rotatably fast with respect to said barrel having radial slots receiving the said piston rods, each slot adapted at its outer end to fit its piston rod when at innermost point of its stroke in its cylinder.

48. In a rotary piston unit, the combination with a rotary head, a rotary barrel having a plurality of longitudinal cylinders, pistons in said cylinders, rods pivoted at their ends to fixed points of the pistons and rotary head respectively, means for holding said rotary members with their axes at an angle to each other, means for rotating one of said rotary members, and a plate rotatably fast with respect to said barrel adapted to engage each of said piston rods at all parts of the path of travel of said rods where they are in operative position to transmit rotation.

49. In a rotary piston unit, the combination with a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and means rotatably fast with respect to one of said rotary members adapted to laterally engage the said piston rods.

50. In a rotary piston unit, the combination of a rotary head, a rotary barrel having a plurality of longitudinal cylinders, pistons in said cylinders, rods connecting said pistons to said rotary head, means for swinging said rotary barrel to vary the angular relation of the axis to the axis of the rotary head, means for rotating one of said rotating members, and means for transmitting rotary motion to the other member from one or more of said piston rods.

51. In a rotary piston unit, the combination of a rotary head, a rotary barrel having a plurality of longitudinal cylinders, pistons in said cylinders, rods connecting said pistons to said rotary head, means for rotating one of said rotary members, the other rotary member being rotatably connected with said rotating member through the said piston rods, and means for swinging the said rotary barrel to vary the angular relation of its axis to the axis of the rotary head.

52. In a rotary piston unit, the combination with a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and a plate connected to one of said rotary members and adapted to engage the piston rods to transmit rotation to the other member.

53. In a rotary piston unit, the combination with a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and a plate rotatably fast with respect to the said barrel having slots adapted to receive the rods of said piston.

54. In a rotary piston unit, the combination with a rotary head, a rotary barrel having a plurality of longitudinal cylinders, pistons in said cylinders, rods connecting said pistons to said rotary head, means for swinging said rotary barrel to vary the angular relation of its axis to the axis of the rotary head, means for rotating one of said rotary members, and a plate rotatably fast with respect to said barrel adapted to engage each of said piston rods at all parts of the path of travel of said rod where it is in operative position to transmit rotation.

CHARLES R. PRATT.

Witnesses:
RUSSELL M. EVERETT,
FRANCES E. BLODGETT.